Nov. 11, 1941.     P. C. RODGERS     2,262,438
GAS HOLDER
Filed June 8, 1939     3 Sheets-Sheet 1
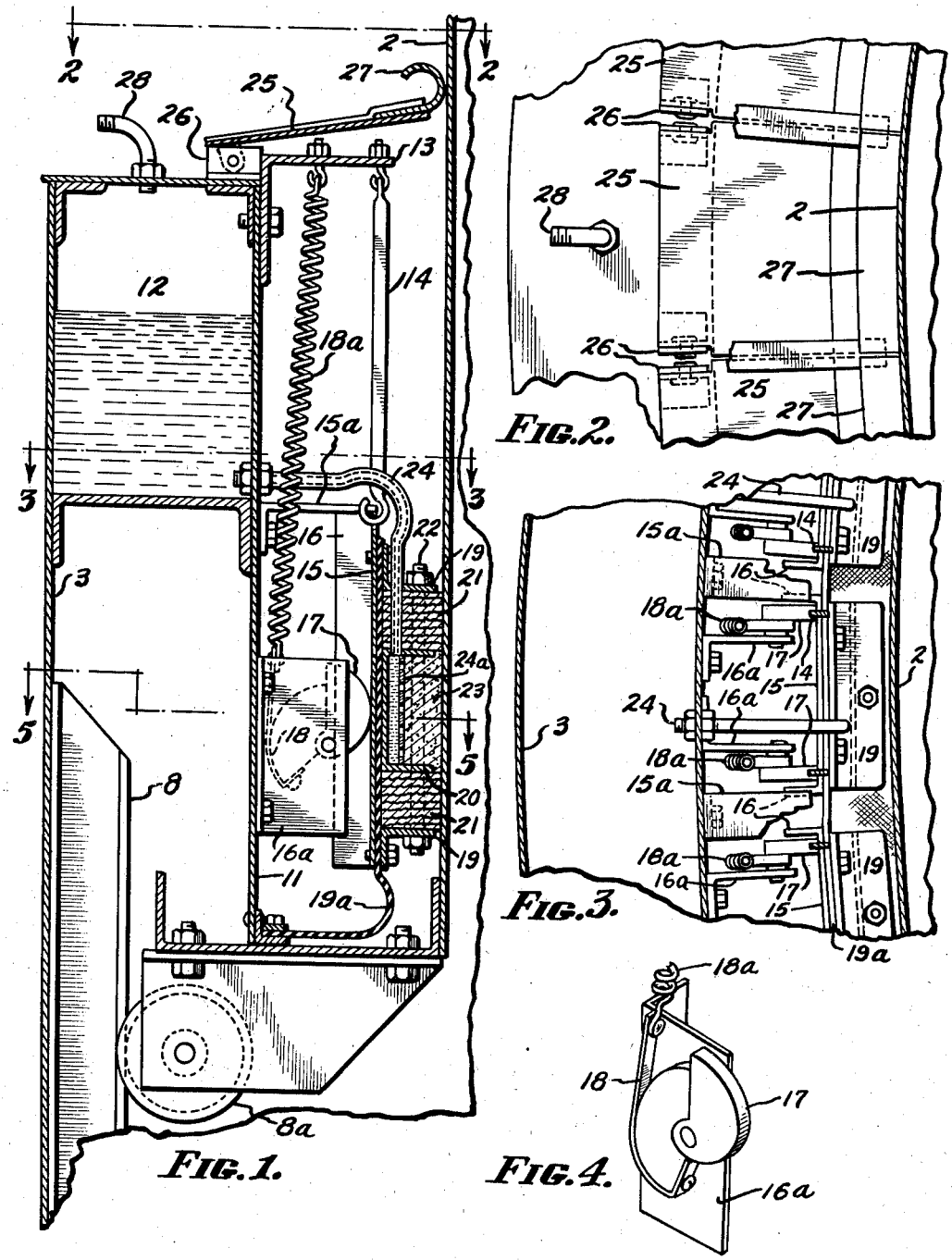
INVENTOR.
PAUL C. RODGERS.
BY Allen & Allen
ATTORNEYS.

Nov. 11, 1941.                P. C. RODGERS                2,262,438
                                GAS HOLDER
                            Filed June 8, 1939           3 Sheets-Sheet 2
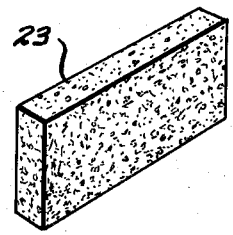
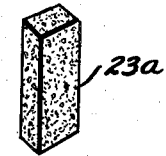
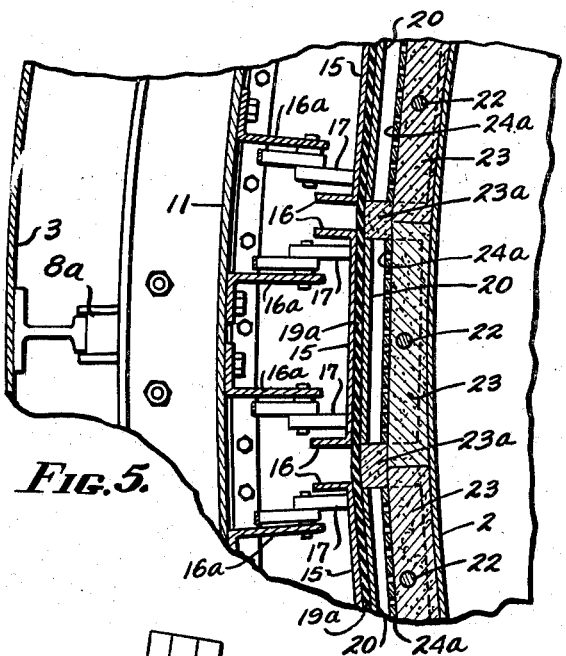
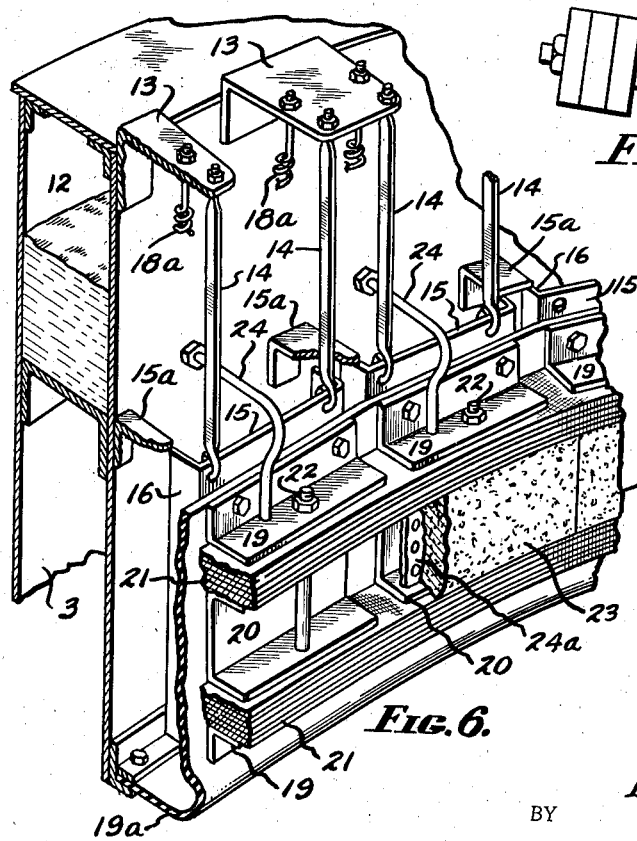
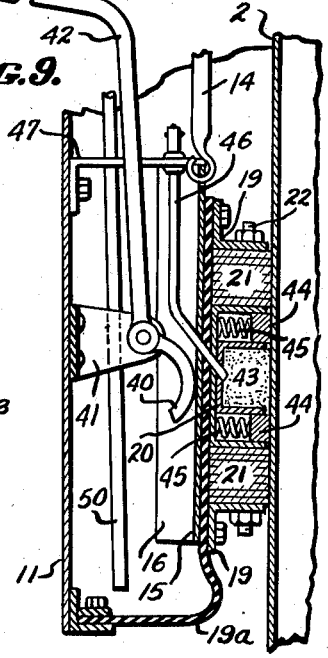
INVENTOR.
PAUL C. RODGERS.
BY Allen & Allen
ATTORNEYS.

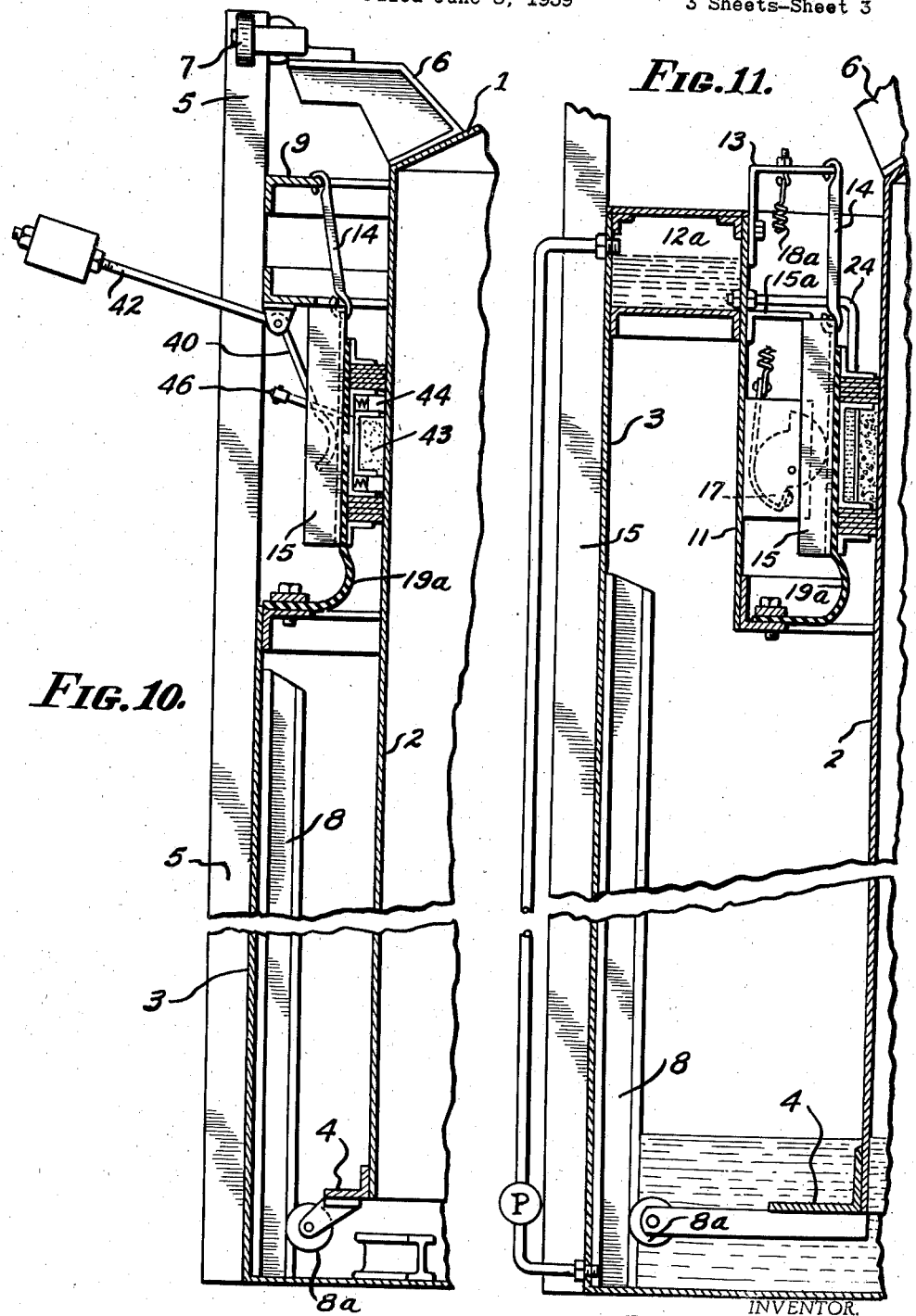

Patented Nov. 11, 1941

2,262,438

UNITED STATES PATENT OFFICE 2,262,438

GAS HOLDER

Paul C. Rodgers, Glendale, Ohio

Application June 8, 1939, Serial No. 278,105

9 Claims. (Cl. 48—176)

My invention relates to gas holders of the telescopic type and to a mechanical contractile seal for use therein.

In a companion application, Serial No. 225,385 filed Aug. 17, 1938 which has matured into Patent No. 2,211,516 in August 13, 1940, I have described a telescopic gas holder in which the several sections are provided with cup and grip seals using oil as a liquid sealing means in the cups together with a contractile mechanical seal acting in conjunction therewith. In the present specification I propose to cover the mechanically contractile seal, and the concept of using such a seal as the sole sealing means between two telescopic members of a gas holder.

Among the objects of my invention is the provision of a mechanically contractile seal which includes means for maintaining a supply of lubricant thereto, and also the provision of a sealing material in the form of a cellulose sponge which will hold oil as a lubricant, in connection with such a seal. I am not aware of any mechanical contractile seal in the gas holder art, and it opens the way to the use of telescopic gas holders with their advantages over the enclosed type of gas holder containing a moving piston, particularly in two section holders having an outer tank and one telescopic section, although a plurality of inner sections could be employed.

According to my invention the seal is mounted near the upper edge of the inner wall or walls of the outer section or sections of a holder, and bears against the outer wall or walls of the inner section or sections.

In the drawings:

Figure 1 is a detail section of the sealing structures illustrating my invention therein.

Fig. 2 is a section on the line 2—2 of Fig. 1.

Fig. 3 is a section on the line 3—3 of Fig. 1.

Fig. 4 is a detail perspective of one of the seal operation elements.

Fig. 5 is a section on the line 5—5 of Fig. 1.

Fig. 6 is a perspective view of a segment of the seal which is employed on each grip member.

Fig. 7 is a perspective showing the cellulose sponge-like material used in one form of my seal.

Fig. 8 is another shape of sponge used by me.

Fig. 9 is a cross section of a modified form of seal as used on the grip members.

Fig. 10 is a view similar to Fig. 9 showing a modification of my invention as used in a two section holder.

Fig. 11 is a view showing the application of the seal of Fig. 1 to a two section holder.

Referring to Figs. 10 and 11 for a showing of the use of my invention as applied to a two section holder, 3 indicates the wall of a cylindrical tank open at the top forming the outer section and 2 indicates the cylindrical wall of the second section or inner section which is guided by tracks 8, engaging rollers 8a, located within the outer section and so as to rise and fall with the amount of gas housed between the two sections. There is an annular flange or series of flange-like projections around the base of the inner section as shown at 4, to serve as an abutment limiting the upward position of the inner section. Guide columns 5 extending outside of the outer section are engaged by rollers 7 mounted on arms 6 secured to the top of the inner section. This inner section in the illustrated form has a roof or top cover 1.

In Fig. 10 the mechanically contractile seal structure is mounted on suitable supporting irons 9 extending around the inside of the columns 5 above the outer section 3. In Fig. 11, the seal is mounted entirely by being secured to the inner top inside wall of the outer section 3 and depends inside of the outer section.

Referring now to the preferred form of seal, as shown in Fig. 1, an annular tank is formed, or a series of tanks are located, around at the inside top wall of the outer section of the gas holder, as noted at 12, with the inside wall thereof, as shown at 11 depending within the tank. On a series of brackets located around the inner periphery of the wall or plate 11, which is preferably annular in shape, are suspended by means of links 14, a series of plates 15 with outwardly projecting flanges 16.

Mounted on a series of frames 16a, located behind each suspended plate are cam members 17, pivotally held on the frames with a band 18 running from one side of the cams around the cam surface and with the other cam surface bearing, as to each device against its plate. Springs 18a secured to the bands and secured also to the brackets 13 tend to rotate the cams so as to exert inward pressure against the plates.

Mounted on the inner faces of the plates by means of angle irons 19 bolted thereto is a flexible skirt 19a of suitable material which is formed in a complete annulus and secured tight to the lower edge of the grip section all of the way around it by any suitable clamps. Between the angle irons located on each plate 15 are channel irons 20, and between the channel irons and the angle irons are mounted strips of packing 21, annular in shape, the structure being held together by means of bolts 22. Held in the channel irons are a series of blocks 23 of a soft, absorbent, or spongy material, preferably cellulose sponge, a product formed of cellulose made up like sponge rubber. This substance has the quality of holding absorbed liquid and presenting a face of the liquid on its surfaces. It is more lasting when filled with oil than sponge rubber would be, and just about as absorbent. In the presence of oil saturating it, this cellulose sponge is quite soft and pliable.

I have already referred to the tanks for oil which I may provide in connection with the device. If these tanks are used, I extend a series of pipes 24 to a space behind the cellulose sponge, and I protect this space by means of series of perforated plates 24a which are set at the backs of the sponge pieces and clamped up together with them in setting up the sealing device. Oil thus fed by gravity to the spaces behind the sponge pieces fills them with oil and the outer oiled surface of the sponge pieces wipes against the section wall to be sealed. The packing strips act as sealing members of course, and the oil film which is set up adds to the effectiveness of this packing. In between the plates 24a and channels 20 I may locate sponge pieces 23a (Figures 5 and 7) which seal off any cracks between the sponges 23.

It will be noted that the structure now described acts as a contractile seal which is held snugly against the outer wall of each telescopic section of the holder. In order to protect the holder against water getting into the seals on the grip section, I provide a series of plates 25 secured pivotally to ears 26 located along the tops of the tank elements. These plates are arranged to overlap each other as shown in Figure 2 and carry curved tongues 27 which wipe the telescopic section walls. The disposition of the plates is at a slant to serve as a rain shed.

I have shown pipes 28, preferably suitable for attachment to a suitable conduit, which permit of pumping oil to the oil boxes of the section grips, and have indicated at P in Figure 11 a pump for accomplishing this, which pump is supplied from the tank section. Replenishing of this oil is done when the sections are down, in the course of the usual inspection, and when they are readily available without any elevator equipment for use by the workman to inspect his work.

As indicating another form of seal, I have shown, as located on the plates 11 (Figure 9) which are spaced away in any desired way from the sections on which they are mounted, the same series of spaced plates 15. Instead of the rotatable cams I have shown cam arms 40 pivoted to brackets 41 on the grip member located behind each plate, said arms having extensions 42 which are weighted, to result in pushing inwardly on the plates. The angle iron and channel iron pieces are mounted up in the same way, and the skirt 19a is the same. The packing rings are also the same, but the equipment in the channel irons is different. In this case there is provided a continuous annular grease channel 43 between which and the flanges of the channel irons are set a series of blocks 44 which act as brushes. Springs 45 are located behind the blocks to press them inwardly against the adjoining section wall. Pipes 46 extend up through the brackets 47 and are equipped with fittings for application of a grease pump to keep the grease boxes full of grease. In this way the seal is kept lubricated with grease, in the place of oil as used in the other seal, and the oil tanks 12 are eliminated.

In order to provide for removal of any water which may get past the rain shed 25 into the seal section between the grip plate 11 and the skirt 19a, I provide a pipe 50, whereby when the holder is being inspected, a suction line may be connected thereto, and the water removed.

I claim:

1. A contractile seal for use in gas holders comprising a series of interspaced rigid plates suspended in an annular arrangement, packing material mounted on said plates and formed in a closed ring, and means for forcing the plates inwardly of the annular arrangement to contract the packing material, said packing material including spongeous material, and means for supplying oil to said material.

2. A contractile seal for use in gas holders comprising a series of interspaced rigid plates suspended in an annular arrangement, packing material mounted on said plates and formed in a closed ring, and means for forcing the plates inwardly of the annular arrangement to contract the packing material, said packing material being formed to two continuous rings of fabric, and spongeous material held between said rings, and means for supplying oil to said spongeous material.

3. A contractile seal for use in gas holders comprising a series of interspaced rigid plates suspended in an annular arrangement, packing material mounted on said plates and formed in a closed ring, and means for forcing the plates inwardly of the annular arrangement to contract the packing material, said packing material being formed to two continuous rings of fabric, and spongeous material held between said rings, and means for supplying oil to said spongeous material, said means comprising perforated plates serving to back the spongeous material, and an oil reservoir feeding to the space behind said plates by gravity.

4. In a seal for use in gas holders means for supporting rings of packing material to form a wiping element, means for moving said packing material into position to engage the element to be sealed, and cellulose sponge mounted between the rings of packing material, and means for supplying oil to said sponge comprising an oil reservoir and foraminated backing for the sponge, said reservoir feeding to the space behind the foraminated backing.

5. A two section telescopic gas holder comprising a fixed outer section open at the top, and an inner section telescoping into the outer section, and an annular seal mounted in fixed position at the top of the outer section, said seal comprising members arranged in an interspaced annular series and having faces arranged to contact the inner section, means operating against said members to urge them inwardly radially of the outer and inner sections, and a substantially continuous sealing facing between the members and arranged to be contracted about and to contact the inner section as the said interspaced members are urged inwardly, whereby an effective telescoping holder is provided having a seal of the "dry" type.

6. A two section telescopic gas holder comprising a fixed outer section open at the top, and an inner section telescoping into the outer section, and an annular seal mounted in fixed position at the top of the outer section, said seal comprising members arranged in an interspaced annular series and having faces arranged to contact the inner section, means operating against said members to urge them inwardly radially of the outer and inner sections, and a substantially continuous sealing facing between the members and arranged to be contracted about and to contact the inner section as the said interspaced members are urged inwardly, whereby an effective telescoping holder is provided having a seal of the "dry" type, and a weather shed of annular form mounted about the outer section so as to cover the space above the seal, said weather shed engaging slidably the wall of the inner section.

7. A two section telescopic gas holder comprising a fixed outer section open at the top, and an inner section telescoping into the outer section, and an annular seal mounted in fixed position at the top of the outer section, said seal comprising members arranged in an interspaced annular series and having faces arranged to contact the inner section, means operating against said members to urge them inwardly radially of the outer and inner sections, and a substantially continuous sealing facing between the members and arranged to be contracted about and to contact the inner section as the said interspaced members are urged inwardly, whereby an effective telescoping holder is provided having a seal of the "dry" type, and means for supplying lubricant to the said facing for lubricating its contact face against the inner section.

8. A telescopic gas holder including at least two sections, an outer section open at the top and an inner section, and an annular seal mounted in fixed position at the top of the outer section, said seal comprising members arranged in an interspaced annular series and having faces arranged to contact the inner section, means operating against said members to urge them inwardly radially of the outer and inner sections, and a substantially continuous sealing facing between the members and arranged to be contracted about and to contact the inner section as the said interspaced members are urged inwardly, whereby an effective telescoping holder is provided having a seal of the "dry" type.

9. A telescopic gas holder including at least two sections, an outer section open at the top and an inner section, and an annular seal mounted in fixed position at the top of the outer section, said seal comprising members arranged in an interspaced annular series and having faces arranged to contact the inner section, means operating against said members to urge them inwardly radially of the outer and inner sections, and a substantially continuous sealing facing between the members and arranged to be contracted about and to contact the inner section as the said interspaced members are urged inwardly, whereby an effective telescoping holder is provided having a seal of the "dry" type, and means for supplying lubricant to the said facing for lubricating its contact face against the inner section.

PAUL C. RODGERS.